(12) United States Patent
Chacko et al.

(10) Patent No.: US 11,393,637 B2
(45) Date of Patent: Jul. 19, 2022

(54) HIGH TEMPERATURE POLYMER HERMETICALLY SEALED CAPACITORS

(71) Applicant: KEMET Electronics Corporation, Simpsonville, SC (US)

(72) Inventors: Antony P. Chacko, Simpsonville, SC (US); Elisabeth Crittendon Key, Simpsonville, SC (US); Philip M. Lessner, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 36 days.

(21) Appl. No.: 16/429,936

(22) Filed: Jun. 3, 2019

(65) Prior Publication Data

US 2020/0388441 A1      Dec. 10, 2020

(51) Int. Cl.
| | |
|---|---|
| *H01G 9/15* | (2006.01) |
| *H01G 9/042* | (2006.01) |
| *H01G 9/00* | (2006.01) |
| *H01G 9/10* | (2006.01) |

(52) U.S. Cl.
CPC ......... *H01G 9/0425* (2013.01); *H01G 9/0029* (2013.01); *H01G 9/10* (2013.01); *H01G 9/15* (2013.01); *H01G 9/042* (2013.01)

(58) Field of Classification Search
None
See application file for complete search history.

(56) References Cited

U.S. PATENT DOCUMENTS

| | | | |
|---|---|---|---|
| 4,812,951 A | 3/1989 | Melody et al. | |
| 5,185,075 A | 2/1993 | Rosenberg et al. | |
| 5,716,511 A | 2/1998 | Melody et al. | |
| 6,235,181 B1 | 5/2001 | Kinard et al. | |
| 6,267,861 B1 | 7/2001 | Kinard et al. | |
| 6,346,185 B1 | 2/2002 | Kinard et al. | |
| 6,436,268 B1 | 8/2002 | Melody et al. | |
| 6,480,371 B1 | 11/2002 | Kinard et al. | |
| 6,652,729 B2 | 11/2003 | Melody et al. | |
| 6,755,959 B2 | 6/2004 | Melody et al. | |
| 7,248,462 B2 | 7/2007 | Melody et al. | |
| 7,497,879 B2 * | 3/2009 | Kakuma | H01G 9/022 29/25.03 |
| 7,678,259 B2 | 3/2010 | Melody et al. | |
| 9,761,347 B2 | 9/2017 | Shi et al. | |
| 9,761,378 B2 | 9/2017 | Shi et al. | |
| 9,941,055 B2 | 4/2018 | Chacko et al. | |
| 10,014,116 B2 | 7/2018 | Shi et al. | |
| 10,074,490 B2 | 9/2018 | Chacko et al. | |
| 10,109,428 B2 | 10/2018 | Shi et al. | |
| 2012/0106031 A1 * | 5/2012 | Vilc | H01G 9/0032 361/525 |
| 2014/0002957 A1 * | 1/2014 | Casasanta, III | H01G 9/038 361/502 |
| 2014/0055913 A1 * | 2/2014 | Chacko | H01G 9/0032 361/528 |

(Continued)

*Primary Examiner* — Dion R. Ferguson
(74) *Attorney, Agent, or Firm* — Joseph T. Guy; Patent Filing Specialist Inc.

(57) ABSTRACT

Provided is an improved capacitor and a method of making an improved capacitor. The capacitor comprises a hermetically sealed casing with a capacitive element in the hermetically sealed casing. The capacitive element comprises a cathode with an ionic liquid in the cathode.

30 Claims, 4 Drawing Sheets

(56) References Cited

U.S. PATENT DOCUMENTS

| | | | | |
|---|---|---|---|---|
| 2014/0293510 | A1* | 10/2014 | Miura | H01G 11/82 |
| | | | | 361/502 |
| 2016/0240323 | A1* | 8/2016 | Chacko | H01G 11/04 |
| 2018/0068803 | A1* | 3/2018 | Brambilla | H01G 11/56 |
| 2018/0082794 | A1* | 3/2018 | Millman | H01G 9/0029 |
| 2019/0333704 | A1* | 10/2019 | Sugawara | H01G 9/04 |

* cited by examiner

HIGH TEMPERATURE POLYMER HERMETICALLY SEALED CAPACITORS

BACKGROUND

The present invention is specific to an improved capacitor and method of making an improved capacitor. More specifically, the present invention is directed to an improved hermetically sealed capacitor with improved performance and a method of manufacturing an improved hermetically sealed capacitor.

Hermetically sealed capacitors have found widespread use in applications where environmental conditions are detrimental to capacitor performance. In general, a hermetically sealed capacitor comprises a capacitive element comprising an anode and a conductive layer separated by a dielectric. The capacitive element is then hermetically sealed in a casing. Whereas wet type hermetically sealed capacitors utilize an electrolyte solution as the cathode conductor, hermetically sealed solid electrolytic capacitors use a solid conductor as the cathode conductor. In recent years intrinsically conductive polymers such as poly 3,4-ethylenedioxythiophene (PEDT) have been used as the preferred cathode conductor in electrolytic capacitors due, in part, to their high electrical conductivity and benign failure mode. Capacitors made using in-situ oxidative polymerization or electrochemical polymerization have high DC leakage current and have been limited to use in capacitors intended for applications at lower working voltage.

A particularly preferred capacitive element comprises a valve metal as the anode and a conductive polymeric cathode. While hermetically sealed capacitors comprising such a capacitive element have been well received commercially, they are deficient with regards to leakage current. Strides have been made to mitigate the poor leakage current performance by humidifying the conductive polymer cathode prior to hermetically sealing. The humidification process is difficult to control in a conventional manufacturing environment. Therefore, the problems associated with leakage current remain as an unresolved problem.

There has been a long-felt desire for improved hermetically sealed capacitors. In particular, there has been a long-felt desire for hermetically sealed solid electrolytic capacitors with lower leakage current and good reliability during the useful life of the capacitor.

SUMMARY

It is an object of the invention to provide an improved method of manufacturing a capacitor, and a capacitor obtained thereby with improved performance.

A particular feature is improved leakage current after aging.

Another particular feature is the ability to provide a hermetically sealed capacitor with low leakage current wherein the capacitor can be manufactured reliably and reproduceably.

These and other advantages, as will be realized, are provided in a method for forming a hermetically sealed capacitor. The method comprises:
forming an anode;
forming a dielectric on the anode;
forming a conductive layer on the dielectric thereby forming a capacitive element
wherein the conductive layer comprises ionic liquid;
inserting the capacitive element into a casing;
electrically connecting the anode to an exterior anode connection;
electrically connecting the cathode to an exterior cathode connection; and
hermetically sealing the casing with said ionic liquid contained in said casing.

Yet another embodiment is provided in a capacitor comprising a hermetically sealed casing. A capacitive element is in the hermetically sealed casing and
an ionic liquid in the cathode of the capacitor element.

DESCRIPTION

The instant invention is directed to an improved hermetically sealed solid electrolytic capacitor comprising an ionic liquid and an improved method of manufacturing a hermetically sealed solid electrolytic capacitor comprising an ionic liquid. More specifically, the present invention is directed to a method of manufacturing a hermetically sealed solid electrolytic capacitor comprising an ionic liquid either preferably within at least one of the conductive layers of the cathode which provides an unexpected improvement in aging process and electric characteristics of finished capacitors.

The invention will be described with reference to the figures which form an integral, non-limiting, part of the specification. Throughout the various figures similar elements will be numbered accordingly.

Figure 1:
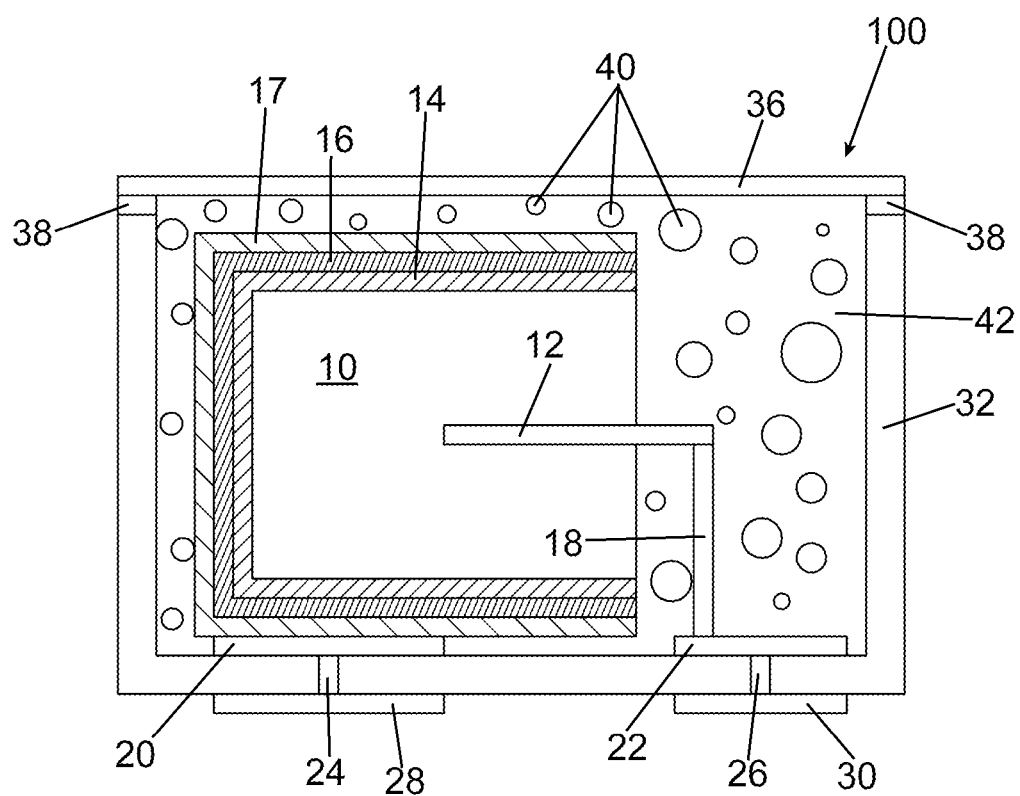
FIG. 1 is a schematic cross-sectional view of an embodiment of the invention.

An embodiment of a hermetically sealed capacitor of the present invention will be described with reference to FIG. 1. In FIG. 1, a hermetically sealed capacitor is represented in schematic cross-sectional view at 100. The capacitor comprises an anode, 10, which is preferably a monolithic anode body comprising a valve metal. An anode wire, 12, extends from the anode body and can either be attached to the anode body, such as by welding, or embedded in the anode body by compression. A dielectric, 14, is on the surface of the anode body and preferably at least partially encases the anode body.

Figure 3:
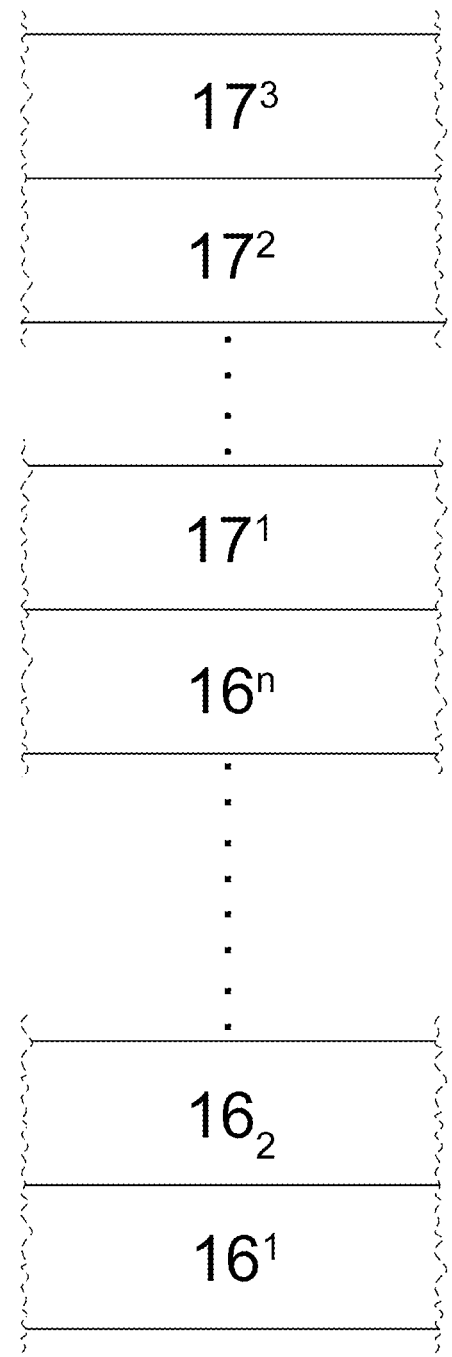
FIG. 3 is a partial cross-sectional view of the conductive layers and adhesive layers.

A conductive layer, 16, is on the surface of the dielectric of the anode body and preferably at least partially encases the dielectric layer. The conductive layer comprises manganese dioxide or conductive polymer with conductive polymer being preferred. The conductive layer is preferably a combination of sub-layers with each sub-layer adhered to adjacent layers as illustrated in FIG. 3. At least one sub-layers comprises an ionic liquid either in a common sub-layer with conductive polymer or as a sub-layer between adjacent sub-layers comprising conductive polymer.

As would be realized, the anode and cathode are separated by a dielectric thereby forming a capacitive couple of the capacitive element. Adhesive layers, 17, are preferably employed to provide an adequate interface for subsequent electrical connections. The adhesive layers preferably comprise adhesive sub-layers, as illustrated in FIG. 3, wherein the adhesive sublayers are independent layers preferably comprising carbon, silver, copper, nickel or other conductive materials either in a binder or as a layer of deposited metal and may include multiple layers. The deposited metal layers can be provided by dipping, vapor deposition, electroplating or electroless plating.

The durability of hermetic capacitors is improved herein by enhancing the film integrity thereby improving the interaction of impregnating electrolyte with the solid electrolyte by forming intermolecular bonds between reactive groups of the solid electrolyte and reactive groups of ionic liquid. The intermolecular bonds can be formed by in-situ reaction of the solid electrolyte reactive groups and the ionic liquid reactive groups. An intermolecular bond is either an ionic bond or a covalent bond and preferably a covalent bond. At least one component of the ionic liquid comprises components with reactive groups otherwise, any conventionally known electrolytic solution may be employed.

The capacitive element is hermetically sealed in a casing, 32, and in one embodiment a non-conducting casing. The cathode is in electrical contact with a cathode trace, 20. The cathode and cathode trace can be electrically attached by a conductive adhesive or by welding. An anode wire is in electrical contact with an anode trace, 22, preferably through an anode lead element, 18, between the anode wire and the anode trace. An external cathode connection, 28, is in electrical contact with the cathode trace, 20, by a connector, 24. An external anode connection, 30, is in electrical contact with the anode trace, 22, by a connector, 26. A cap, 36, is secured to the casing by a hermetic seal, 38. A preferably gaseous atmosphere, 40, is encased within a cavity, 42, of the casing wherein the gaseous atmosphere may comprise an inert gas.

Figure 2:
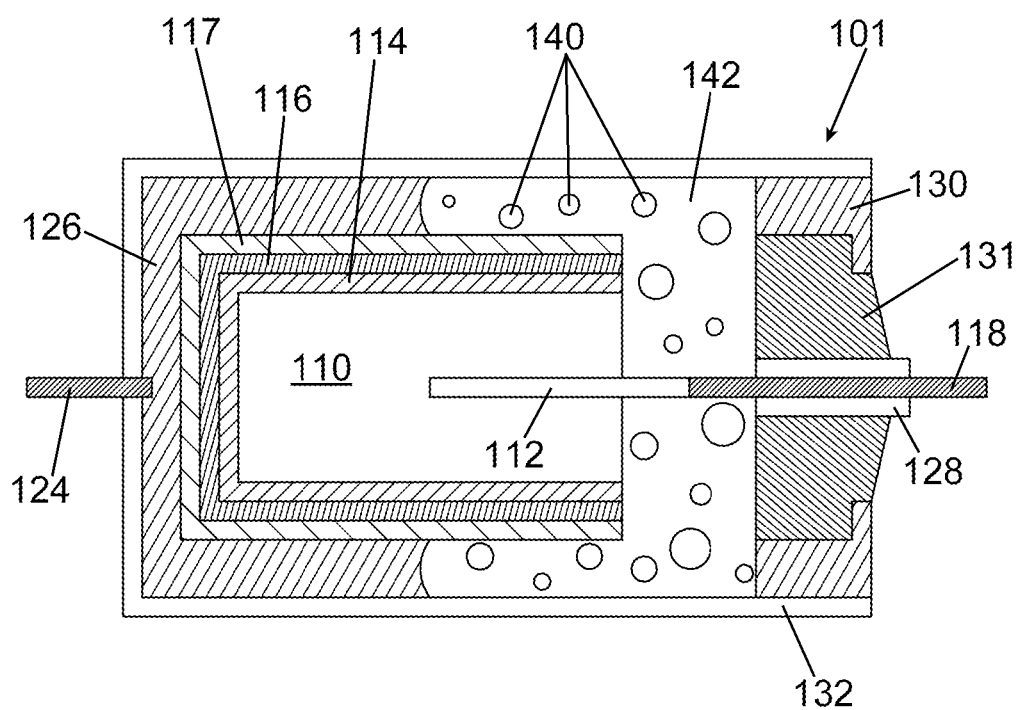
FIG. 2 is a schematic cross-sectional view of an embodiment of the invention.

Another embodiment of a hermetically sealed solid electrolytic capacitor of the present invention will be described with reference to FIG. 2. In FIG. 2, a hermetically sealed capacitor comprising an ionic liquid is represented in schematic cross-sectional view at 101. The capacitor, comprises an anode, 110, which is preferably a monolithic anode body comprising a valve metal. An anode wire, 112, extends from the anode body and can be attached to the anode body, such as by welding, or embedded in the anode body by compression. A dielectric, 114, is on the surface of the anode body and preferably at least partially encases the anode body. A conductive layer, 116, which functions as the cathode, is on the surface of the dielectric of the anode body and preferably at least partially encases the dielectric layer. As discussed relative to FIG. 1, and illustrated in FIG. 3, the conductive layer preferably comprises sub-layers with at least one sub-layer comprising ionic liquid.

As would be realized, the anode and cathode are separated by a dielectric thereby forming a capacitive couple of the capacitive element. Adhesive layers, 117, are preferably employed to provide an adequate interface for subsequent electrical connection to the casing and the cathode lead wire, 124. The adhesive layers preferably comprise sublayers, as discussed relative to FIG. 1 and illustrated in FIG. 3, including layers independently comprising carbon, silver, copper, nickel or other conductive materials either in a binder, or as a layer of deposited metal, and may include multiple layers. The deposited metal layers can be provided by dipping, vapor deposition, electroplating or electroless plating.

The capacitive element is hermetically sealed in a casing, 132, which in one embodiment is a conductive casing. An internal connection material, 126, electrically connects the conductive layers, 117, to cathode lead wire, 124. The internal connection material can be either an internal solder or an electrically conductive adhesive. The cathode lead wire, 124, is attached to the casing or it may extend into the internal connection material, 126. An external anode lead, 118, is connected, preferably by welding, to the anode wire, 112. With a conductive casing the cathode lead wire is optional. The external anode lead extends out of the casing. A positive seal, 128, encases at least a portion of the external anode lead and/or the anode wire. An edge seal, 131, hermetically seals the casing with a cap material, 130. While not limited thereto, the external anode lead and cathode lead are preferably nickel. Although many metallic and glass to metal seal materials can be used to provide hermetic sealing of the casing, the positive seal material and the edge sealing material are preferably solder. A preferably gaseous atmosphere, 40, is encased within a cavity, 142, of the casing wherein the gaseous atmosphere may comprise an inert gas.

It has been surprisingly determined that performance of a hermetically sealed solid electrolytic capacitor can be improved by including ionic liquid within the cathode layer of the capacitor.

Ionic liquids (ILs) are generally defined as organic salts with a melting point lower than 100° C. which present a good chemical and electrochemical stability, low flammability, negligible vapor pressure and high ionic conductivity. In a liquid state and with negligible vapor pressure, ionic liquids are commonly considered as green solvents for industrial production. Ionic liquids are organic salts in which the ions are poorly coordinated and melt below 100° C., and preferably at about room temperature. Ionic liquids have a wide electrochemical operational window and comparably high matrix mobility at room temperature. Because ionic liquids are entirely composed of ions, their charge density is much higher than that of an ordinary salt solution.

In a particularly preferred embodiment the ionic liquid is immobilized within the cathode by an immobilizing group selected from a mordant, an ionic group capable of forming an ionic couple with a component of the conductive polymer layers or a crosslinkable group capable of crosslinking with a crosslinkable group on a component of the conductive polymer layer. Mordant groups inhibit migration by steric interference and are therefore usually branched hydrocarbons. Ionic couples are formed by an ionic attraction between cationic groups and anionic groups. Crosslinkable groups form a chemical bond between reactants. Immobilizing groups include any organic compounds with reactive groups. Examples of these are organometallic compounds such as epoxy silanes, aminosilanes, crosslinkable compounds such as bifunctional epoxy compounds, compounds which form gels with ionic liquids such as tetra amine modified polyethylene glycols, hydrocolloid polysaccharides etc.

Poly(ionic liquids)s (PILs), refer to a subclass of polyelectrolytes that feature an ionic liquid species in each monomer repeating unit, connected through a polymeric backbone to form a macromolecular architecture as set forth in *Progress in Polymer Science* Volume 38, Issue 7, July 2013, Pages 1009-1036. Some of the unique properties of ionic liquids are incorporated into the polymer chains. Polymeric ionic liquids expand the properties and applications of ionic liquids and common polyelectrolytes. Due to the solvent-independent ionization state of the ionic liquid species, polymeric ionic liquids are permanent and strong polyelectrolytes. The characteristic feature of absorbing water is a common feature of ionic liquids and polymeric ionic liquids.

A particularly preferred ionic liquid has a cation defined by Formula I

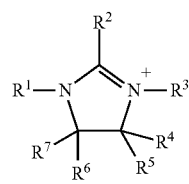

Formula I wherein each $R^1$ to $R^3$, independently is a $C_{1-20}$ alkyl group; preferably methyl, ethyl, n-propyl and isopropyl;

which may be unsubstituted or substituted with a polymeric chain, a phosphate, a sulfate, an ether or polyether. Each $R^4$ to $R^7$, independently, is a substituted or unsubstituted $C_{1-20}$ alkyl or a hydrogen atom.

Room temperature ionic liquids (RTILs) consist of bulky and asymmetric organic cations such as 1-alkyl-3-methyl-imidazolium, 1-alkylpyridinium, N-methyl-N-alkylpyrrolidinium and ammonium ions. Phosphonium cations are less common, but offer some advantageous properties. A range of anions are employed, ranging from simple halides, which generally have high melting points, to inorganic anions such as tetrafluoroborate and hexafluorophosphate, and to large organic anions like bistriflimide, triflate or tosylate. There are also many potential uses of ionic liquids with simple non-halogenated organic anions such as formate, alkylsulfate, alkylphosphate or glycolate. The melting point of 1-butyl-3-methylimidazolium tetrafluoroborate is about −80° C. (−112° F.) and it is a colorless liquid with high viscosity at room temperature. If a highly asymmetric cation is combined with a highly asymmetric anion, formed ionic liquid may not freeze down to very low temperatures (down to −150° C.) and the glass transition temperature was detected below −100° C. in the case of ionic liquids with N-methyl-N-alkylpyrrolidinium cations and fluorosulfonyl-trifluoromethanesulfonylimide (FTFSI). Water is a common impurity in ionic liquids as it can be absorbed from the atmosphere and influences the transport properties of RTILs, even at relatively low concentrations.

Particularly preferred ionic liquids are selected from the group consisting of:

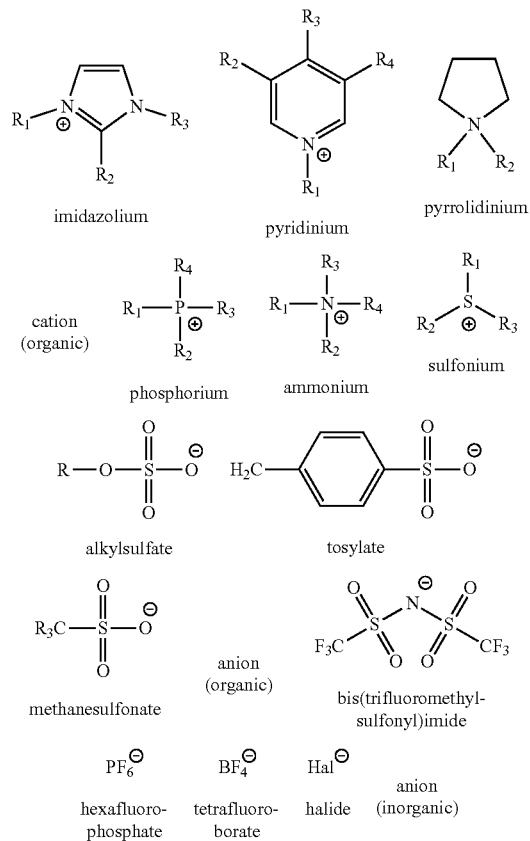

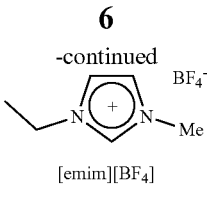

[emim][BF4]

e: ethyl
m: methyl
im: imidazolium others: [emim][PF6], [emim][NO3]
[emim][ClO4], [emim][CF3SO3]

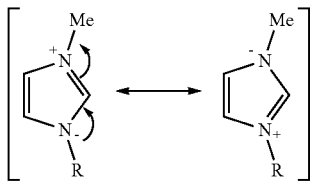

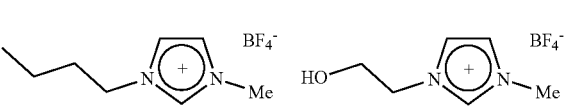

[bmim][BF4]          [hydemin][BF4]

others: [bmim][Br], [bmim][Cl], [bmim][PF6]

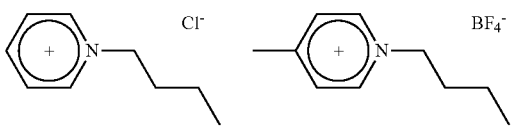

[bpy][Cl]            [bmpy][BF4]

Particularly preferred ionic liquids comprise a cation selected from the group consisting of 1,2,3,4-tetramethyl-imidazolinium; 1,3,4-trimethyl-2-ethylimidazolinium; 1,3-dimethyl-2,4-diethylimidazolinium; 1,2-dimethyl-3,4-diethylimidazolinium; 1-methyl-2,3,4-triethylimidazolinium; 1,2,3,4-tetraethyl-imidazolinium; 1,2,3-trimethylimidazolinium; 1,3-dimethyl-2-ethylimidazolinium; 1-ethyl-2,3-dimethylimidazolinium and 1,2,3-triethylimidazolinium.

Exemplary polymeric ionic liquids are selected from the group consisting of:

Cationic PILs

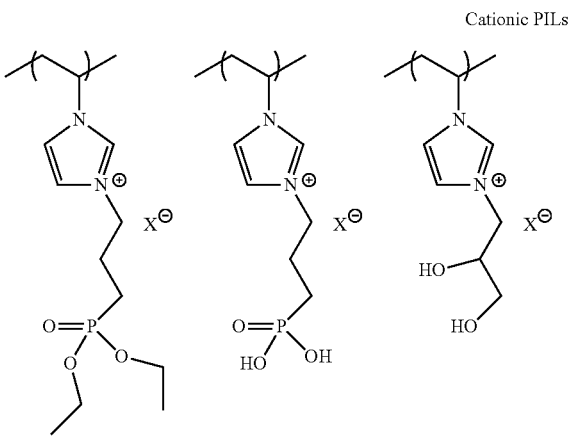

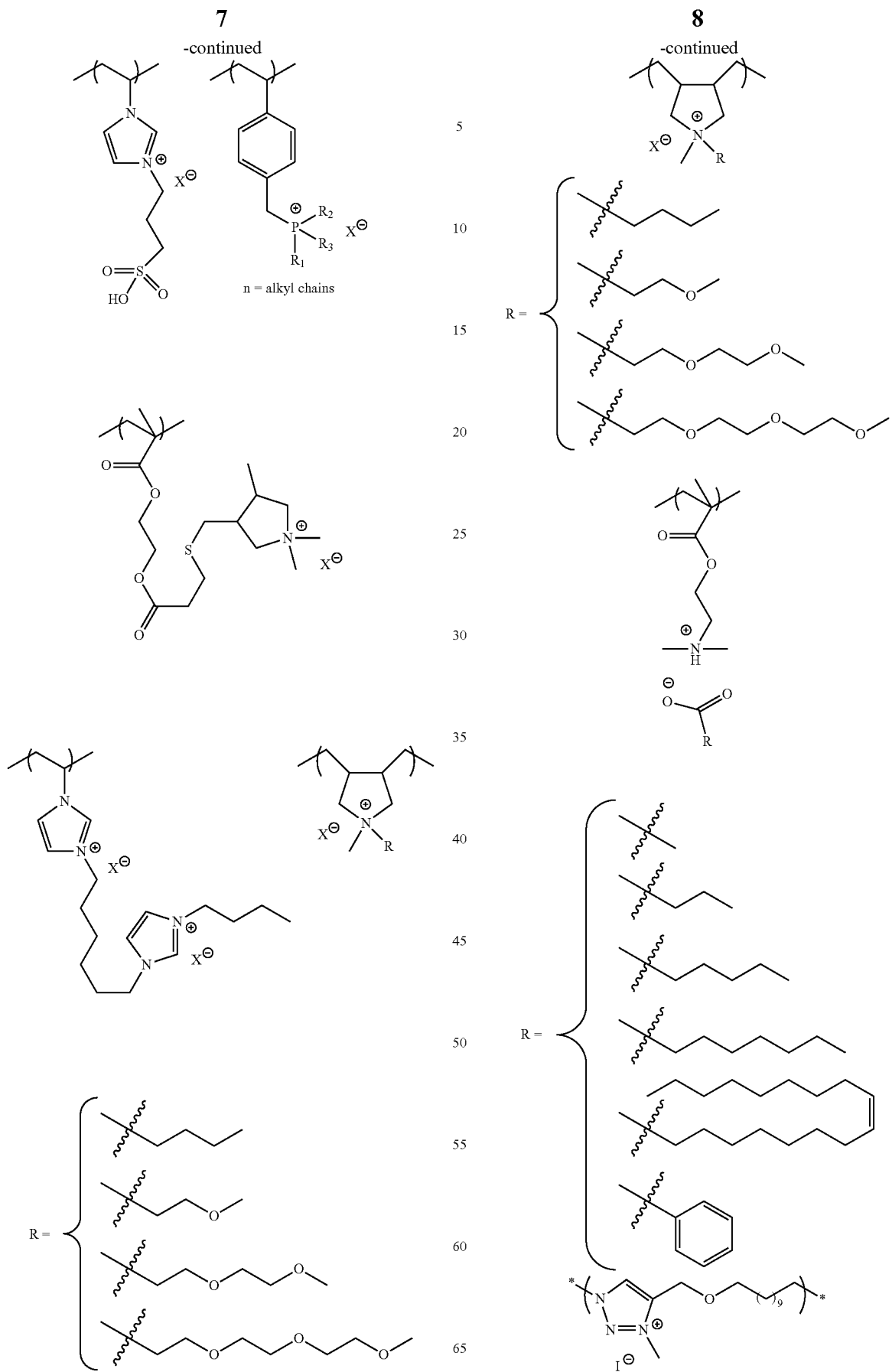

Anionic PILs

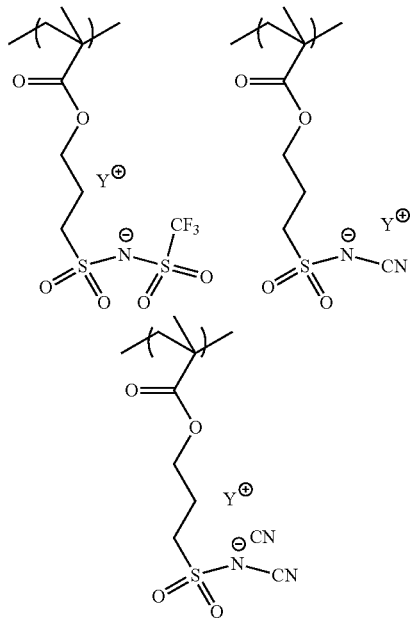

1-ethyl-3-methylimidazolium tetrafluoroborate and derivatives thereof.

The method of manufacturing the hermetically sealed solid electrolytic capacitor will be described with reference to FIG. 4.

Figure 4:
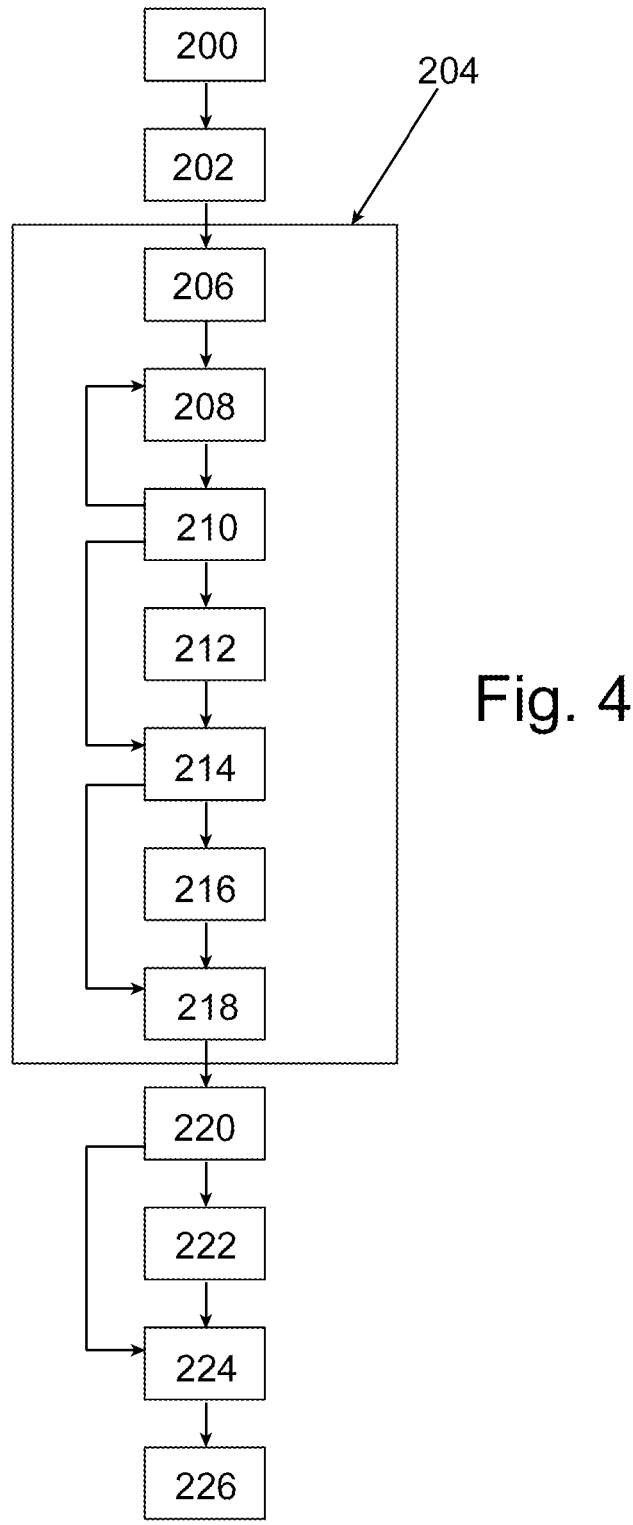
FIG. 4. is a flow chart representation of an embodiment of the invention.

In FIG. 4, an anode is formed at 200. In a preferred embodiment the anode is formed from a powder which is compressed to form a monolithic body. In another embodiment the anode is a foil which is optionally, and preferably, etched to increase surface area. The shape and dimension of the anode is not particularly limited herein. In the case of a compressed powder anode an anode wire can be attached to the anode after compression, such as by welding, or the anode wire can be inserted into the powder and the powder compressed around the anode wire thereby forming an anode with an anode wire embedded in the anode and extending therefrom.

A dielectric is formed on the anode at 202. While not limited thereto, a preferred dielectric is an oxide of the anode material. This is preferred primarily for manufacturing convenience. Preferably, the dielectric is an oxide of Al, W, Ta, Nb, Ti, Zr and Hf with $Al_2O_3$, $Ta_2O_5$ and $Nb_2O_5$ being most preferred. The method of forming the dielectric is not limited herein. Anodization of a valve metal to form a dielectric is well understood in the art and described in detail in U.S. Pat. Nos. 7,678,259; 7,248,462; 6,755,959; 6,652,729; 6,480,371; 6,436,268; 6,346,185; 6,267,861; 6,235,181; 5,716,511; 5,185,075 and 4,812,951. One method for anodization employs anodizing solutions having a water content below approximately 30% in combination with alkanol amine, phosphoric acid and an organic solvent. Monoethanol amine, diethanol amine, triethanol amine, ethyl diethanolamine, diethyl ethanolamine, dimethyl ethanolamine and dimethyl ethoxy ethanolamine (dimethyl amino ethoxy ethanol) are mentioned as alkanol amines. Ethylene glycol, diethylene glycol, polyethylene glycol 300 and tetraethylene glycol dimethyl ether, are mentioned as solvents. It is generally desirable to conduct the anodizing at temperatures below about 50° C., preferably within a pH range of 4-9 which can be adjusted with phosphoric acid if desired.

A cathode is formed on the dielectric at 204. The cathode is a conductor preferably comprising at least one of manganese dioxide or a intrinsically conductive polymeric material as known in the art. In a particularly preferred embodiment a conductive polymer layer is formed at 206, referred to as an internal layer, wherein the internal layer or layers is formed in such a manner as to coat the interstitial areas of the dielectric. In a particularly preferred embodiment the internal layer or layers is formed from a slurry comprising conductive polymer wherein the conductive polymer either has small particle sizes or is effectively a soluble polymer. As would be understood to those of skill in the art any layer may be formed by multiple applications of layer components. In one embodiment an ionic liquid layer is formed on the internal layer at 208. Additional conductive polymer layers are formed at 210, preferably by precipitation from a slurry, wherein each application of the slurry may be on a previously applied layer of conductive polymer or a previously applied layer comprising an ionic liquid.

The conductive polymer layers are optionally, but preferably, crosslinked at 212 to increase adhesion between adjacent layers and at least partially immobilize the ionic liquid either by crosslinking with at least some fraction of the ionic liquid or by crosslinking the surrounding matrix. Crosslinking of conductive layers is described in U.S. Pat. Nos. 10,109,428; 10,074,490; 10,014,116; 9,941,055; 9,761,378 and 9,761,347.

The coating is optionally washed at 214 to remove unreacted reactants and an ionic liquid is optionally applied at 216 to account for any ionic liquid removed by washing. In one embodiment the ionic liquid is applied to a portion of the conductive polymer which is exposed at the face from which the anode wire extends.

Adhesion layers are preferably applied at 218 wherein the adhesion layers are employed to improve adhesion between the conductor and the termination. Particularly preferred adhesion layers include carbon, silver, copper, or another conductive material in a binder or a metalized layer such as nickel or silver.

The capacitive element, which comprises an anode and cathode with a dielectric there between, is inserted into a casing at 220. The casing preferably has a cavity within which the capacitive element resides. The anode wire is electrically connected to an external anode connection and the cathode is electrically connected to an external cathode connection. In one embodiment the casing comprises connectors between internal traces and external connections wherein the capacitor is electrically connected to the internal traces by welding, conductive adhesive or the like.

A preferably gaseous environment is inserted in the casing at 222 and the casing is hermetically sealed with the ionic liquid therein at 224. The gaseous environment may be ambient air or ambient air can be at least partially displaced by an inert gas a dried gas or a humidified gas.

It is preferred that the capacitors be tested at 226. One portion of the testing is a burn-in wherein the capacitor is subjected to 1.0 to 1.5 times the rated voltage at a temperature of 50° C. to 150° C. More preferably, the capacitor is aged at 1.2 to 1.4 times of the rated voltage at a temperature of 75° C. to 125° C.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf.

Most preferably, the anode comprises at least one material selected from the group consisting of Al, Ta, Nb and NbO.

The anode wire is most preferably constructed of the same material as the anode. The anode wire can be welded onto the anode surface under protective atmosphere or inserted into a powder prior to compression of the powder to form a porous anode body.

The dielectric is a non-conductive layer which is not particularly limited herein. The dielectric may be a metal oxide or a ceramic material. A particularly preferred dielectric is the oxide of an anode metal due to the simplicity of formation and ease of use.

The conducting polymer is preferably chosen from polypyrroles, polyanilines, polythiophenes and polymers comprising repeating units of Formula B, particularly in combination with organic sulfonates. A particularly preferred polymer is 3,4-polyethylene dioxythiophene (PEDOT).

Though not limited thereto, the present invention is particularly suitable for use in forming conductive polymers of polyanilines, polypyrroles and polythiophenes each of which may be substituted. The preferred monomer for polymerization is shown as polymerized in Formula II:

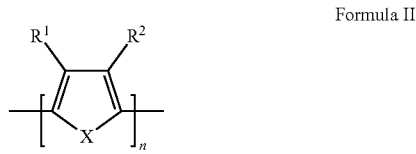

Formula II wherein:

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7- membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl;

X is S, N or O and most preferable X is S;

$R^1$ and $R^2$ of Formula II are preferably chosen to prohibit polymerization at the β-site of the ring as it is most preferred that only α-site polymerization be allowed to proceed; it is more preferred that $R^1$ and $R^2$ are not hydrogen and more preferably, $R^1$ and $R^2$ are α-directors with ether linkages being preferable over alkyl linkages; it is most preferred that the $R^1$ and $R^2$ are small to avoid steric interferences.

In a particularly preferred embodiment the $R^1$ and $R^2$ of Formula II are taken together to represent —O-$(CHR^4)_n$— O— wherein:

n is an integer from 1 to 5 and most preferably 2;

$R^4$ is independently selected from hydrogen; a linear or branched $C_1$ to $C_{18}$ alkyl radical $C_5$ to $C_{12}$ cycloalkyl radical, $C_6$ to $C_{14}$ aryl radical $C_7$ to $C_{18}$ aralkyl radical or $C_1$ to $C_4$ hydroxyalkyl radical, optionally substituted with a functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^4$ is selected from —$(CHR^5)_a$-$R^{16}$; —$O(CHR^5)_a R^{16}$; —$CH_2O(CHR^5)_a R^{16}$; —$CH_2O(CH_2CHR^5O)_a R^{16}$, or $R^4$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, $SO_3M$, anhydride, silane, acrylate and phosphate; $R^5$ is H or alkyl chain of 1 to 5 carbons optionally substituted with functional groups selected from carboxylic acid, hydroxyl, amine, alkene, thiol, alkyne, azide, epoxy, acrylate and anhydride;

$R^{16}$ is H or $SO_3M$ or an alkyl chain of 1 to 5 carbons optionally substituted with functional groups selected from carboxylic acid, hydroxyl, amine, substituted amines, alkene, thiol, alkyne, azide, amide, imide, sulfate, $SO_3M$, amide, epoxy, anhydride, silane, acrylate and phosphate;

a is integer from 0 to 10; and

M is a H or cation preferably selected from ammonia, sodium or potassium.

Particularly preferred conductive polymers include poly (3,4-ethylenedioxythiophene); poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl) methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3, 4-b][1,4]dioxin-2-yl)methoxy alcohol, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly (3-butoxythiophene), poly(3-hexyloxythiophene), poly(3-heptyloxythiophene), poly(3-octyloxythiophene), poly(3-decyloxylhiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyeihylthiophene), poly(3-methyl-4-carboxybutylihiophene), polyaniline, poly(2-methylaniline), poly(3-isobutylaniline), poly(2-aniline sulfonate), poly(3-aniline sulfonate), and the like.

Particularly suitable polymers or co-polymers are selected from the group consisting of polypyrrole, polythiophene, poly(4-(2,3-dihydrothieno-[3,4-b][1,4]dioxin-2 -yl) methoxy)-1-butane-sulphonic acid, salt), poly(4-(2,3-dihydrothieno-[3,4-b ][1,4]dioxin-2-yl)methoxy)-1-methyl-1-propane-sulphonic acid, salt), poly(N-methylpyrrole), poly (3-methylthiophene), poly(3-methoxythiophene), and poly (3,4-ethylenedioxythiophene).

A particularly preferred conductive polymer is poly 3,4-ethylenedioxythiophene (PEDT). PEDT can be made by in situ polymerization of EDT monomer such as Clevius M V2, which is commercially available from Hereaus Clevious, with an oxidizer such as ferric tosylate solution available as Clevios® C from Hereaus Clevios. The application and polymerization of heterocyclic conductive polymers such as polypyrrole, polyaniline, polythiophene and their derivatives is widely described and well known to those of skill in the art. Additional conductive layers preferably include layers comprising carbon, silver, copper, nickel or other conductive materials either in a binder or as a layer of deposited metal and may include multiple layers are preferably deposited on the polymeric cathode layer to improve subsequent adhesion.

The casing can be a metal or a ceramic. The casing may include a single layer or multiple layers with aluminum nitride, aluminum oxide, silicon oxide, magnesium oxide and calcium oxide being mentioned as exemplary materials. Conductive materials, such as a metal, are mentioned as exemplary for demonstration of the invention. The metal casing may include a surface coating on the interior and/or exterior thereof to increase conductivity or to improve solderability. A conductive casing may be constructed of brass with a solder coating, such as a Sn/Pb plating, on the inside and outside of the casing. The width, length and depth of the casing are selected for the application and are not otherwise limited herein. It would be readily apparent that a minimal size consistent with the application is preferred. In general, a length of 1 to about 25 millimeters with a width, or diameter in the case of a cylindrical case, of 0.5 to 10 millimeters is mentioned as being suitable for demonstration of the invention.

The capacitive element can be electrically connected to the casing in any manner known in the art. In one embodiment various surfaces of the casing may comprise interior conductive traces, or conductive pads, that are electrically connected to exterior conductive traces or conductive pads. The capacitive element is then electrically connected to the interior conductive traces or conductive pads and the exterior conductive traces or conductive pads are connected to a circuit trace to add capacitance to a circuit. The conductive trace or conductive pad is a conductive material without limit. Copper, nickel, silver, zinc, tin, palladium, lead, aluminum, molybdenum, titanium, iron, zirconium, tungsten, magnesium and alloys thereof are mentioned as suitable for demonstration of the instant invention. Copper, copper alloys; such as copper-zirconium, copper-magnesium, copper-zinc or copper-iron; nickel, nickel alloys; such as nickel-iron; and gold coated metal layers are particularly suitable for demonstration of the invention. An ink containing the conductor may be deposited in a predetermined pattern, such as by ink jet printing, to form the conductive traces or conductive pads.

The internal conductive traces or conductive pads may be electrically connected to external conductive traces or pads thereby allowing the hermetically sealed capacitor to be mounted on a surface. The internal conductive traces or conductive pads and external conductive traces or conductive pads are electrically connected by any method known in the art. The conductive material may extend through the casing or may be in the form of pins, pads, sheets, etc. The external conductive traces or conductive pads are preferably as thin as possible to minimize total size of the hermetically sealed capacitor with the proviso that adequate conductivity is achieved.

EXAMPLES

Comparative Example 1

A series of identical capacitive elements were prepared with a cylindrical tantalum anode having a diameter of 4.7 mm and a length of 10.2 mm comprising a tantalum wire lead. A tantalum pentoxide dielectric was prepared in accordance with U.S. Pat. No. 5,716,511. A dielectric coating layer comprising an epoxy silane compound was applied on the dielectric. The anode thus formed was dipped into a commercial Clevios Knano LV dispersion and oven dried to remove water. This process was repeated until a sufficient thickness was achieved. A second conductive polymer dispersion containing commercial Clevios KNano IL dispersion was applied to form a subsequent polymer layer. A third conductive polymer dispersion containing commercial Clevios KV2 dispersion was applied to form a subsequent polymer layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and treated for 24 hours in an air atmosphere maintained at about 50% relative humidity at 23° C. and packaged. Capacitance and ESR were measured on packaged parts.

Comparative Example 2

A series of identical capacitive elements were prepared with a cylindrical tantalum anode having a diameter of 4.7 mm and a length of 10.2 mm comprising a tantalum wire lead. A tantalum pentoxide dielectric was prepared in accordance with U.S. Pat. No. 5,716,511. A dielectric coating layer comprising an epoxy silane compound was applied on the dielectric. The anode thus formed was dipped into a commercial Clevios Knano LV dispersion and oven dried to remove water. This process was repeated until a sufficient thickness was achieved. A second conductive polymer dispersion containing commercial Clevios KV2 dispersion was applied to form a subsequent polymer layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR were measured on packaged parts.

Inventive Example 1

A series of identical capacitive elements were prepared with a cylindrical tantalum anode with a diameter of 4.7 mm and a length of 10.2 mm comprising a tantalum wire lead. A tantalum pentoxide dielectric was prepared in accordance with U.S. Pat. No. 5,716,511. A dielectric coating layer comprising an epoxy silane compound was applied on the dielectric. The anode thus formed was dipped into a commercial Clevios Knano LV dispersion and oven dried to remove water. This process was repeated until a sufficient thickness was achieved. An ionic liquid ((1-Ethyl-3-methylimidazolium bis(trifluoromethylsulfonyl)imide) solution in isopropanol was applied on the first (internal) conductive polymer layer. An external conductive polymer dispersion containing commercial Clevios KV2 dispersion was applied on the ionic liquid layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR were measured on packaged parts.

Inventive Example 2

A series of identical capacitive elements were prepared with a cylindrical tantalum anode with a diameter of 4.7 mm and a length of 10.2 mm comprising a tantalum wire lead. A tantalum pentoxide dielectric was prepared in accordance with U.S. Pat. No. 5,716,511. A dielectric coating layer comprising an epoxy silane compound was applied on the dielectric. The anode thus formed was dipped into a commercial Clevios Knano LV dispersion and oven dried to remove water. This process was repeated until a sufficient thickness was achieved. An aminosilane solution as applied over the first conductive polymer layer. An ionic liquid (1-Ethyl-3-methylimidazolium bis(trifluoromethylsulfonyl) imide) solution in isopropanol was applied on the aminosilane layer. An external conductive polymer dispersion containing commercial KS2 dispersion comprising crosslinking agents was applied on the ionic liquid layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR were measured on packaged parts.

Inventive Example 3

A series of identical capacitive elements were prepared with a cylindrical tantalum anode with a diameter of 4.7 mm and a length of 10.2 mm comprising a tantalum wire lead. A tantalum pentaoxide dielectric was prepared in accordance with U.S. Pat. No. 5,716,511. A dielectric coating layer comprising an epoxy silane compound was applied on the dielectric. The anode thus formed was dipped into a commercial Clevios Knano LV dispersion and oven dried to remove water. This process was repeated until a sufficient thickness was achieved. A mixture of aminosilane and an ionic liquid (1-Ethyl-3-methylimidazolium bis(trifluoromethylsulfonyl)imide) solution in isopropanol was applied on the first conductive polymer layer. An external conductive polymer dispersion containing commercial KS2 dispersion comprising crosslinking agent was applied on the ionic liquid layer. After drying, alternating layers of a diamine salt and the second conductive polymer dispersion was applied and repeated 4-5 more times. The anodes with the conductive polymer layers were washed and dried, followed by sequential coating of a graphite layer and a silver layer to produce a solid electrolytic capacitor. Parts were assembled and packaged. Capacitance and ESR were measured on packaged parts.

Inventive Example 4

A series of identical capacitive elements were prepared with a cylindrical tantalum anode with a diameter of 4.7 mm and a length of 10.2 mm comprising a tantalum wire lead. A tantalum pentoxide dielectric was prepared in accordance with U.S. Pat. No. 5,716,511. A dielectric coating layer comprising an epoxy silane compound was applied on the dielectric. The anode thus formed was dipped into a commercial Clevios Knano LV dispersion and oven dried to remove water. This process was repeated until a sufficient thickness was achieved. An external conductive polymer dispersion containing PEDOT:PSSA dispersion comprising a crosslinking agent was applied on the ionic liquid layer. After drying, alternating layers of a diamine salt and the second conductive polymer dispersion was applied and repeated 4-5 more times. The anodes with the conductive polymer layers were washed and dried. An ionic liquid (1-Ethyl-3-methylimidazolium bis(trifluoromethylsulfonyl) imide) solution in isopropanol was applied on the external conductive polymer layer. This was followed by sequential coating of a graphite layer and a silver layer to produce a solid electrolytic capacitor. Parts were assembled and packaged. Capacitance and ESR were measured on packaged parts.

Inventive Example 5

A series of identical capacitive elements were prepared with a cylindrical tantalum anode with a diameter of 4.7 mm and a length of 10.2 mm comprising a tantalum wire lead. A tantalum pentoxide dielectric was prepared in accordance with U.S. Pat. No. 5,716,511. A dielectric coating layer comprising an epoxy silane compound was applied on the dielectric. The anode thus formed was dipped into a PEDOT: PSS dispersion comprising an epoxy crosslinker and oven dried to remove water. This process was repeated until a sufficient thickness was achieved. An external conductive polymer dispersion containing commercial Clevios KV2 dispersion was applied on the ionic liquid layer. After drying, alternating layers of a diamine salt and the second conductive polymer dispersion was applied and repeated 4-5 more times. The anodes with the conductive polymer layers were washed and dried. This was followed by sequential coating of a graphite layer and a silver layer to produce a solid electrolytic capacitor. The capacitor was placed in a solder coated brass casing with an outside diameter of 7.1 mm, a height of 16.5 mm and a wall thickness of 0.30 mm. Using a Sn/Pb/Ag/62/36/2 RMA flux core solder an electrically conductive bond was formed between the cathode and the casing. An ionic liquid (1-Ethyl-3-methylimidazolium bis(trifluoromethylsulfonyl)imide) solution in isopropanol was applied on the top of the anode to the exposed cathode polymer layer on the face from which the anode wire extends while in the casing. The capacitor was then sealed.

Inventive Example 6

A series of identical capacitive elements were prepared with a cylindrical tantalum anode with a diameter of 4.7 mm and a length of 10.2 mm comprising a tantalum wire lead. A tantalum pentoxide dielectric was prepared in accordance with U.S. Pat. No. 5,716,511. A dielectric coating layer comprising an epoxy silane compound was applied on the dielectric. The anode thus formed was dipped into a commercial Clevios Knano LV dispersion and oven dried to remove water. This process was repeated until a sufficient thickness was achieved. An external conductive polymer dispersion containing commercial Clevios KV2 dispersion was applied on the ionic liquid layer. After drying, alternating layers of a diamine salt and the second conductive polymer dispersion was applied and repeated 4-5 more times. The anodes with the conductive polymer layers were washed and dried. This was followed by sequential coating of a graphite layer and a silver layer to produce a solid electrolytic capacitor. The capacitor was placed in a solder coated brass casing with an outside diameter of 7.1 mm, a height of 16.5 mm and a wall thickness of 0.30 mm. Using a Sn/Pb/Ag/62/36/2 RMA flux core solder an electrically conductive bond was formed between the cathode and the casing. A mixture comprising of an inert gas and an ionic liquid (1-Ethyl-3-methylimidazolium bis(trifluoromethylsulfonyl)imide) solution in isopropanol was applied on the top of the anode to the exposed cathode polymer layer on the face from which the anode wire extends while in the casing. The capacitor was then sealed.

Inventive Example 7

A series of identical capacitive elements were prepared with a cylindrical tantalum anode with a diameter of 4.7 mm and a length of 10.2 mm comprising a tantalum wire lead. A tantalum pentaoxide dielectric was prepared in accordance with U.S. Pat. No. 5,716,511. A dielectric coating layer comprising an epoxy silane compound was applied on the dielectric. The anode thus formed was dipped into a commercial Clevios Knano LV dispersion and oven dried to remove water. This process was repeated until a sufficient thickness was achieved. An external conductive polymer dispersion containing commercial Clevios KV2 dispersion was applied on the ionic liquid layer. After drying, alternating layers of a diamine salt and the second conductive polymer dispersion was applied and repeated 4-5 more times. The anodes with the conductive polymer layers were washed and dried. This was followed by sequential coating of a graphite layer and a silver layer to produce a solid electrolytic capacitor. The capacitor was placed in a solder coated brass casing with an outside diameter of 7.1 mm, a height of 16.5 mm and a wall thickness of 0.30 mm. Using a Sn/Pb/Ag/62/36/2 RMA flux core solder an electrically conductive bond was formed between the cathode and the casing. A mixture of an aminosilane and an ionic liquid (1-Ethyl-3-methylimidazolium bis(trifluoromethylsulfonyl) imide) solution in isopropanol was applied on the top of the anode to the exposed cathode polymer layer situated in the casing. The capacitor was then sealed.

The inventive samples demonstrated an improved leakage current in testing relative to the comparative example.

| T550B756/75 (75 uF, 75 Vr) | Life test at 0.67 Vr at 150 C. Initial leakage (microamps) | Life test at 0.67 Vr at 150 C. leakage after 500 hrs (microamps) |
| --- | --- | --- |
| Comparative example 1 | 0.55 | 15.8 |
| Comparative example 2 | 1.08 | 35.8 |
| Inventive example 1 | 0.66 | 3.06 |
| Inventive example 2 | 1.02 | 4.02 |
| Inventive example 3 | 1.54 | 4.89 |

The invention has been described with reference to preferred embodiments without limit thereto. One of skill in the art would readily appreciate additional embodiments and improvements which are within the scope of the invention as more specifically set forth in the claims appended hereto.

The invention claimed is:

1. A method for forming a hermetically sealed capacitor comprising:
   forming an anode;
   forming a dielectric on said anode;
   forming a silane layer on said dielectric;
   forming a solid electrolyte on said silane layer wherein said solid electrolyte comprises;
   a first conductive polymer layer directly on said silane layer;
   an ionic liquid layer on said first conductive polymer layer wherein said ionic liquid layer comprises an ionic liquid wherein said ionic liquid layer further comprises organometallic compounds, epoxy crosslinkers or gel forming reactive polymers; and
   a second conductive polymer layer on said ionic liquid layer;
   inserting said capacitive element into a casing;
   electrically connecting said anode to an exterior anode connection;
   electrically connecting said solid electrolyte to an exterior cathode connection; and
   hermetically sealing said casing with said solid electrolyte contained in said casing.

2. The method for forming a hermetically sealed capacitor of claim 1 wherein said ionic liquid has a cation defined by Formula I:

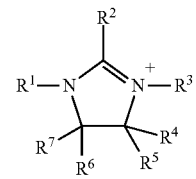

Formula I wherein each $R^1$ to $R^3$, independently is a $C_{1-20}$ alkyl group; preferably methyl, ethyl, n-propyl and isopropyl; which may be unsubstituted or substituted with a polymeric chain, a phosphate, a sulfate, an ether or polyether, each $R^4$ to $R^7$ independently, is a substituted or unsubstituted $C_{1-20}$ alkyl or a hydrogen atom.

3. The method for forming a hermetically sealed capacitor of claim 1 wherein said ionic liquid is selected from the group consisting of: 1,2,3,4-tetramethylimidazolinium; 1,3,4-trimethyl-2-ethylimidazolinium; 1,3-dimethyl-2,4-diethylimidazolinium; 1,2-dimethyl-3,4-diethylimidazolinium; 1-methyl-2,3,4-triethylimidazolinium; 1,2,3,4-tetraethylimidazolinium; 1,2,3-trimethylimidazolinium; 1,3-dimethyl-2-ethylimidazolinium; 1-ethyl-2,3-dimethylimidazolinium and 1,2,3-triethylimidazolinium.

4. The method for forming a hermetically sealed capacitor of claim 1 wherein said ionic liquid is selected from the group consisting of:

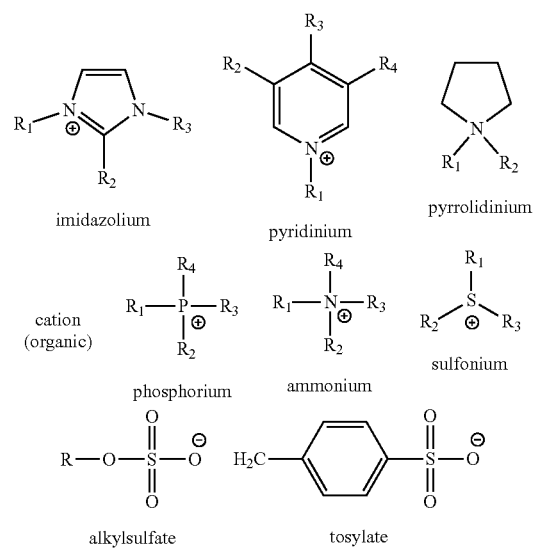

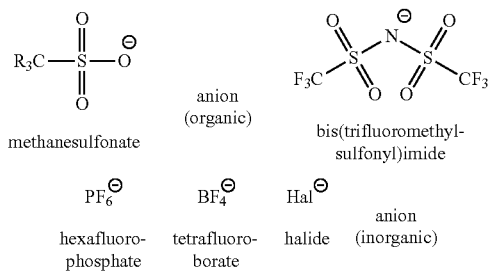
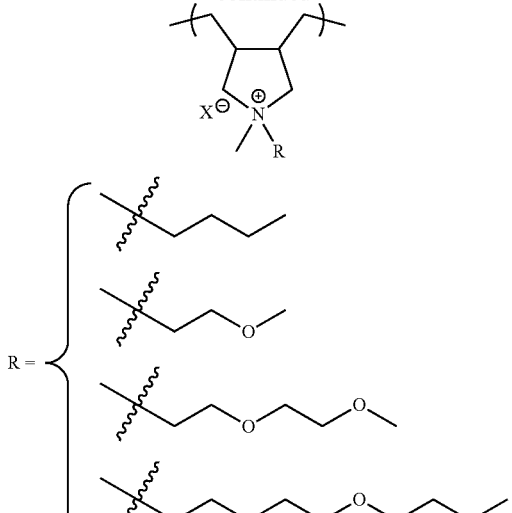
Cationic PILs
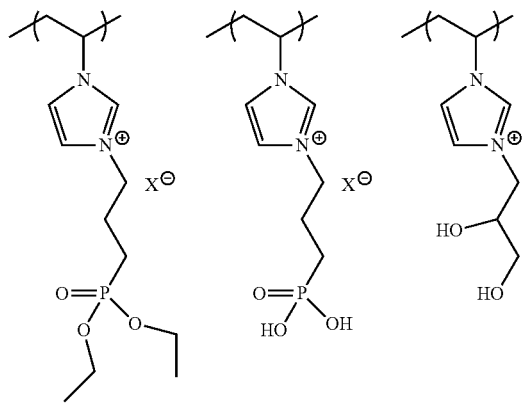
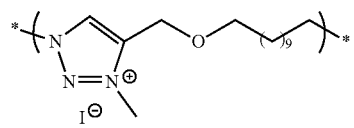
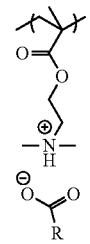
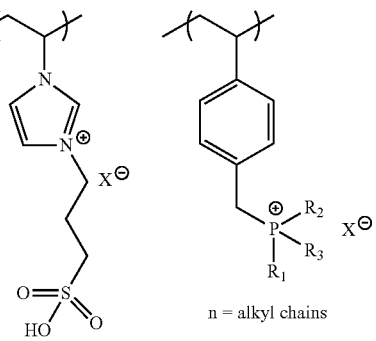
n = alkyl chains
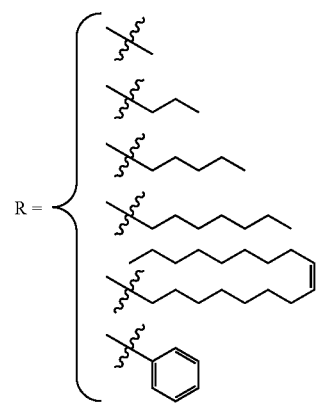
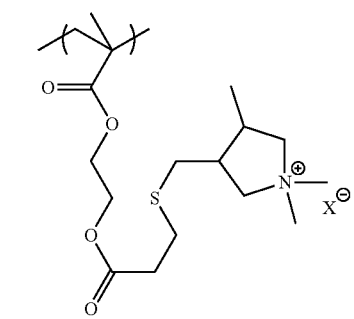
Anionic PILs
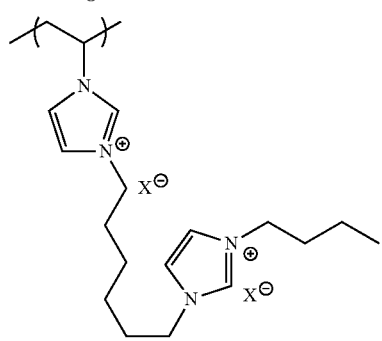
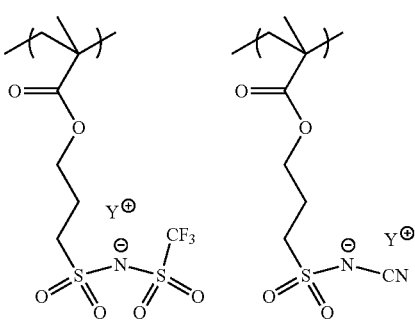

-continued

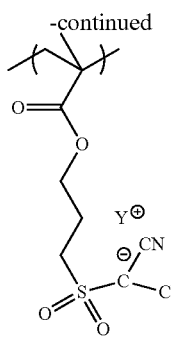

1-ethyl-3-methylimidazolium tetrafluoroborate and derivatives thereof.

5. The method for forming a hermetically sealed capacitor of claim 1 wherein
said ionic liquid is ((1-Ethyl-3-methylimidazolium bis (trifluoromethylsulfonyl)imide).

6. The method for forming a hermetically sealed capacitor of claim 1 wherein said casing is selected from a conductive casing and a non-conductive casing.

7. The method for forming a hermetically sealed capacitor of claim 1 wherein said anode comprises a valve metal or a conductive oxide of said valve metal.

8. The method for forming a hermetically sealed capacitor of claim 7 wherein said valve metal is selected from Al, W, Ta, Nb, Ti, Zr and Hf.

9. The method for forming a hermetically sealed capacitor of claim 7 wherein said anode comprises a material selected from the group consisting of Ta, Nb and NbO.

10. The method for forming a hermetically sealed capacitor of claim 1 wherein said first conductive layer comprises at least one material selected from manganese dioxide and a conductive polymer.

11. The method for forming a hermetically sealed capacitor of claim 10 wherein said conductive polymer is a prepolymerized dispersion of intrinsically conductive polymer.

12. The method for forming a hermetically sealed capacitor of claim 10 wherein said conductive polymer is a polythiophene.

13. The method for forming a hermetically sealed capacitor of claim 12 wherein said polythiophene is a prepolymerized dispersion of polythiophene.

14. The method for forming a hermetically sealed capacitor of claim 12 wherein said polythiophene is poly 3,4-ethylenedioxythiophene.

15. The method for forming a hermetically sealed capacitor of claim 14 wherein said poly 3,4-ethylenedioxythiophene is a prepolymerized dispersion of poly 3,4-ethylenedioxythiophene.

16. A capacitor comprising:
a hermetically sealed casing;
a solid electrolyte capacitive element in said hermetically sealed casing wherein said solid electrolyte capacitive element comprises;
an anode;
a dielectric on said anode;
a silane on said dielectric; and
a cathode wherein said cathode comprises;
a first conductive polymer layer on said silane;
an ionic liquid on said first conductive polymer layer wherein said ionic liquid layer further comprises organometallic compounds, epoxy crosslinkers or gel forming reactive polymers; and
a second conductive polymer layer on said ionic liquid.

17. The capacitor of claim 16 wherein said ionic liquid has a cation defined by Formula I:

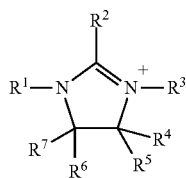

Formula I wherein each $R^1$ to $R^3$, independently is a $C_{1-20}$ alkyl group; preferably methyl, ethyl, n-propyl and isopropyl; which may be unsubstituted or substituted with a polymeric chain, a phosphate, a sulfate, an ether or polyether, each $R^4$ to $R^7$ independently, is a substituted or unsubstituted $C_{1-20}$ alkyl or a hydrogen atom.

18. The capacitor of claim 16 wherein said ionic liquid is selected from the group consisting of: 1,2,3,4-tetramethylimidazoliniurn; 1,3,4-trimethyl-2-ethylimidazolinium; 1,3-dimethyl-2,4-diethylimidazolinium; 1,2-dimethyl-3,4-diethylimidazolinium; 1-methyl-2,3,4-triethylimidazolinium; 1,2,3,4-tetraethyl-imidazolinium; 1,2,3-trimethylimidazolinium; 1,3-dimethyl-2-ethylimidazolinium; 1-ethyl-2,3-dimethylimidazolinium and 1,2,3-triethylimidazolinium.

19. The capacitor of claim 16 wherein said ionic liquid is selected from the group consisting of:

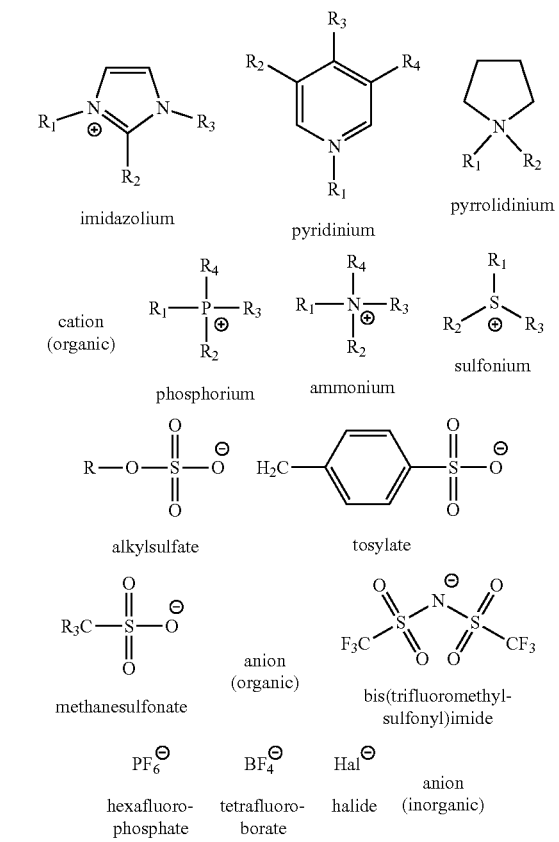

-continued
Cationic PILs
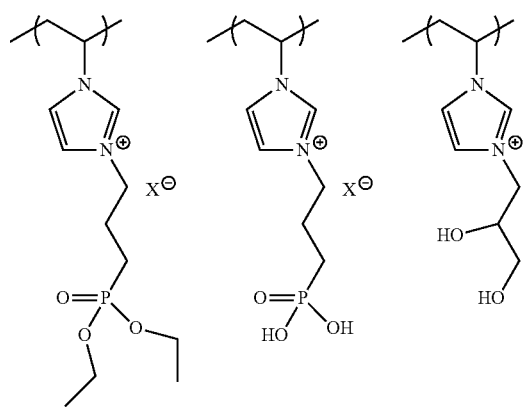
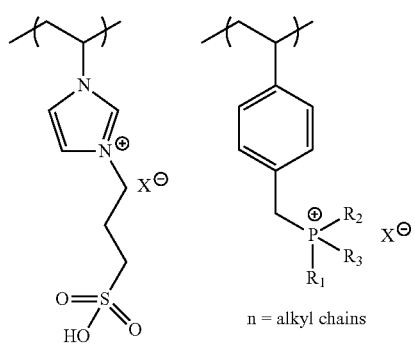
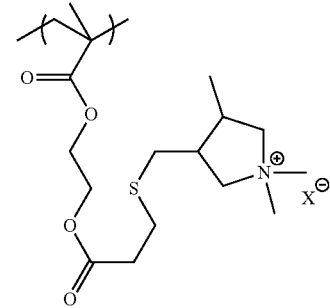
n = alkyl chains
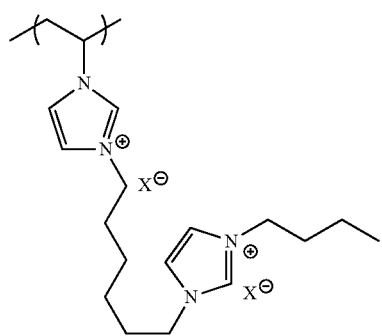
-continued
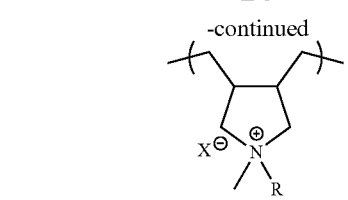
R = 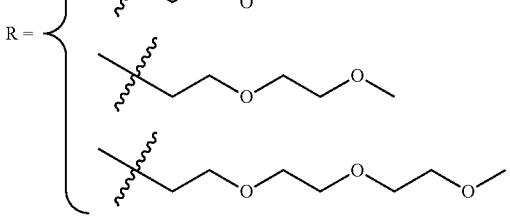
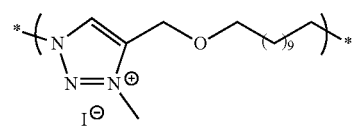
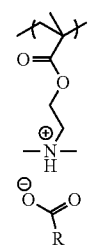
R = 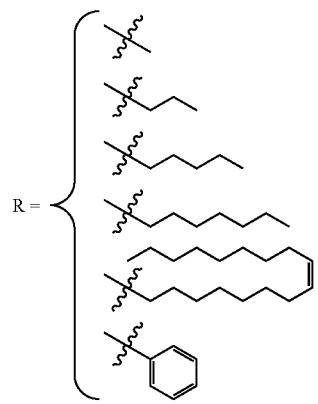
Anionic PILs
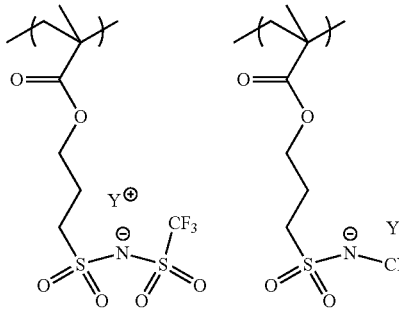

-continued

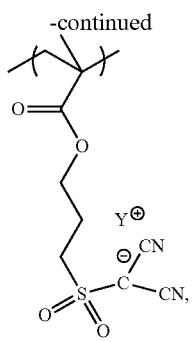

1-ethyl-3-methylimidazolium tetrafluoroborate and derivatives thereof.

20. The capacitor of claim 16 wherein said ionic liquid is ((1-Ethyl-3- methylimidazolium bis(trifluoromethylsulfonyl)imide).

21. The capacitor of claim 16 wherein said casing is selected from a conductive casing and a non-conductive casing.

22. The capacitor of claim 16 wherein said anode comprises a valve metal or a conductive oxide of said valve metal.

23. The capacitor of claim 22 wherein said valve metal is selected from Al, W, Ta, Nb, Ti, Zr and Hf.

24. The capacitor of claim 22 wherein said anode comprises a material selected from the group consisting of Ta, Nb and NbO.

25. The capacitor of claim 16 wherein said first conductive polymer layer comprises a conductive polymer which is a prepolymerized dispersion of intrinsically conductive polymer.

26. The capacitor of claim 16 wherein said conductive polymer is a polythiophene.

27. The capacitor of claim 26 wherein said polythiophene is a prepolymerized dispersion of polythiophene.

28. The capacitor of claim 26 wherein said polythiophene is poly 3,4-ethylenedioxythiophene.

29. The capacitor of claim 28 wherein said poly 3,4-ethylenedioxythiophene is a prepolymerized dispersion of poly 3,4-ethylenedioxythiophene.

30. The capacitor of claim 16 wherein said ionic liquid layer comprises organometallic compounds, epoxy crosslinkers or gel forming reactive polymers.

* * * * *